US 7,489,867 B1
Feb. 10, 2009

(12) United States Patent
Viscardi et al.

(54) VOIP SERVICE OVER AN ETHERNET NETWORK CARRIED BY A DWDM OPTICAL SUPERVISORY CHANNEL

(75) Inventors: Valerio Viscardi, Paderno Dugnano (IT); Fulvio Arecco, Monza (IT); Filippo Bentivoglio Ravasio, Monza (IT)

(73) Assignee: Cisco Technology, Inc., San Jose, CA (US)

( * ) Notice: Subject to any disclaimer, the term of this patent is extended or adjusted under 35 U.S.C. 154(b) by 585 days.

(21) Appl. No.: 10/139,455

(22) Filed: May 6, 2002

(51) Int. Cl.
*H04B 10/20* (2006.01)
*H04J 14/00* (2006.01)

(52) U.S. Cl. .................................................... 398/58

(58) Field of Classification Search .................. 398/58, 398/31, 34; 370/254, 316
See application file for complete search history.

(56) References Cited

U.S. PATENT DOCUMENTS

| | | | | |
|---|---|---|---|---|
| 4,914,650 | A * | 4/1990 | Sriram | 370/235 |
| 5,113,459 | A | 5/1992 | Grasso et al. | |
| 5,673,129 | A * | 9/1997 | Mizrahi | 398/95 |
| 6,236,499 | B1 * | 5/2001 | Berg et al. | 359/341.2 |
| 6,252,952 | B1 | 6/2001 | Kung et al. | 379/114.1 |
| 6,621,621 | B1 * | 9/2003 | Jones et al. | 359/337.11 |
| 6,662,254 | B1 * | 12/2003 | Tal et al. | 710/300 |
| 6,826,158 | B2 * | 11/2004 | Seaman et al. | 370/254 |
| 6,829,247 | B1 * | 12/2004 | Corkum et al. | 370/465 |
| 7,007,296 | B2 * | 2/2006 | Rakib | 725/111 |
| 2002/0051468 | A1 | 5/2002 | Ofek et al. | 370/503 |
| 2002/0101831 | A1 * | 8/2002 | Gutman et al. | 370/316 |
| 2002/0176131 | A1 * | 11/2002 | Walters et al. | 359/118 |
| 2003/0048501 | A1 * | 3/2003 | Guess et al. | 359/118 |
| 2003/0076857 | A1 * | 4/2003 | Morita et al. | 370/466 |
| 2003/0198471 | A1 * | 10/2003 | Ovadia | 398/47 |

FOREIGN PATENT DOCUMENTS

| | | |
|---|---|---|
| EP | 1162862 | 12/2001 |
| WO | WO01/95063 | 12/2001 |
| WO | WO02/30019 | 4/2002 |
| WO | WO02/33863 | 4/2002 |

OTHER PUBLICATIONS

Marshall, Howard et al., U.S. Patent Application entitled "DWDM Systen With IP Telephony Provisioning at Remote Locations", U.S. Appl. No. 09/858,777, filed May 15, 2001.
International Search Report of Nov. 5, 2003.

* cited by examiner

*Primary Examiner*—Quan-Zhen Wang
(74) *Attorney, Agent, or Firm*—Cindy Kaplan

(57) ABSTRACT

A local area network is used to interconnect media equipment, such as telephones, VoIP telephones, a media server, etc., located at geographically distributed sites of an optical communication system. The local area network may be implemented within an optical services channel carried by a WDM optical communication link. This may provide the needed connectivity at low costs and may allow conference calls to be accommodated.

20 Claims, 6 Drawing Sheets

VOIP SERVICE OVER AN ETHERNET NETWORK CARRIED BY A DWDM OPTICAL SUPERVISORY CHANNEL

STATEMENT OF RELATED APPLICATION

The present application is related to the subject matter of U.S. patent application Ser. No. 09/858,777, filed on May 15, 2001, the contents of which are herein incorporated by reference in their entirety for all purposes.

BACKGROUND OF THE INVENTION

The present invention relates generally to media communications among sites of an optical communication system.

Modern optical communication links increasingly extend over great distances, e.g., thousands of kilometers. Optical links of such reach typically are divided into multiple spans with optical amplification equipment placed between the spans. Optical add/drop multiplexers to remove and substitute optical channels are also often distributed throughout the link. Equipment requiring supervision and maintenance is therefore found at the transmit end of the link, at the receive end of the link, and at many amplification sites in between.

Like in many communication systems, configuration, diagnosis, and repair of the link often involve coordination in real time among personnel at two or more remotely located sites. It is especially desirable for the personnel to communicate by telephone. Intermediate amplification sites are, however, often found in remote areas where there is no ready connection to the public telephone network. These sites are often outside cellular telephone coverage areas. Even if the site itself is located in a wireless coverage area, the specific location of the optical equipment will often be in a shielded subterranean area.

A need thus arises to somehow utilize the optical communication link, which is optimized for throughput of very large volumes of data, to exchange voice telephone signals between sites as desired. Various prior art approaches have been developed that make use of a wavelength dedicated to management functionality and referred to as the Optical Supervisory Channel (OSC). In one approach, a 64 Kbps digital channel is established in reserved bytes of the OSC and specialized equipment is used to translate between analog telephone signals and the format required by the special digital channel. The specialized equipment is both very expensive and bulky. Also, certain services such as call waiting, call forwarding, on-line directory, voicemail message display, etc., cannot be accommodated.

An alternative approach is to equip each site with an IP (Layer 3) router and a voice over IP (VoIP) telephone or combination of analog telephone and VoIP router card. Due to the expense of the router, this approach can also be quite expensive and can consume considerable space. Furthermore, conference calls can only be accommodated by way of a difficult capacity-increasing modification to the modem that implements the optical service channel, since the bandwidth requirements for a conference call are roughly proportional to the number of connected users (sites). Improved systems and methods for voice connectivity among WDM sites are needed.

SUMMARY OF THE INVENTION

By virtue of one embodiment of the present invention, a local area network is used to interconnect media equipment, such as telephones, VoIP telephones, a media server, etc., located at geographically distributed sites of an optical communication system. The local area network may be implemented within an optical services channel carried by a WDM optical communication link. This may provide the needed connectivity at low costs and may allow conference calls to be accommodated.

A first aspect of the present invention provides a method for providing media access at a site in a WDM system. The method includes: providing connectivity to a LAN interconnecting a plurality of physically separated sites in the WDM system, the LAN being implemented via an optical service channel of the WDM system, and exchanging media packets with another site via the LAN.

A second aspect of the present invention provides, at a site in a WDM system, apparatus for exchanging media information with another site via an optical service channel of the WDM system. The apparatus includes: a LAN access device providing connectivity to a LAN interconnecting a plurality of sites of the WDM system via an optical services channel, and a media device that exchanges media IP packets with the another site via the LAN.

Further understanding of the nature and advantages of the inventions herein may be realized by reference to the remaining portions of the specification and the attached drawings.

DESCRIPTION OF SPECIFIC EMBODIMENTS

The present invention may be applied to optical communication systems such as wavelength-division-multiplexed (WDM) optical communication links. As a specific example, embodiments of the present invention may provide voice connectivity among sites of an optical communication. Other types of media connectivity may be provided as well including video connectivity, web-based conferencing, etc.

Networking and Computer Equipment

Figure 1:
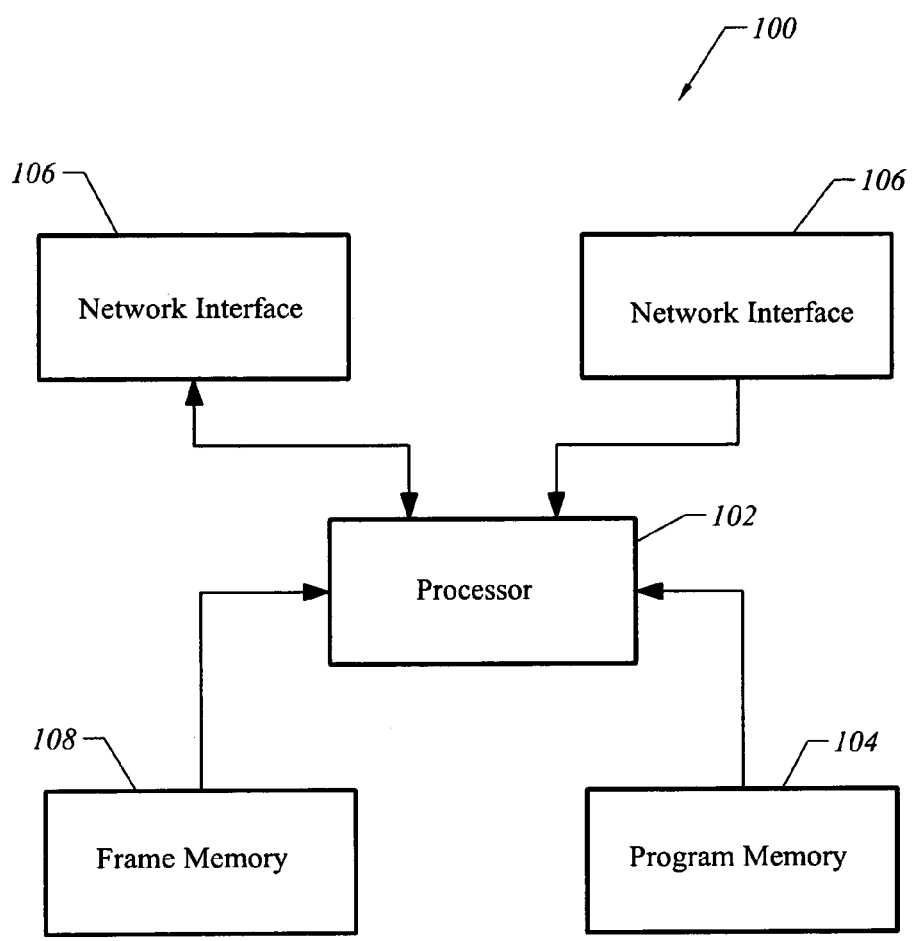
FIG. 1 depicts a network device useful in implementing one embodiment of the present invention.

FIG. 1 depicts a network device 100 useful in implementing one embodiment of the present invention. In one embodiment, network device 100 is a programmable machine that may be implemented in hardware, software, or any combination thereof. A processor 102 executes code stored in a program memory 104. Program memory 104 is one example of a computer-readable storage medium. Program memory 104 can be a volatile memory such as a random access memory (RAM). Another form of computer-readable storage medium storing the same codes would be some type of non-volatile storage such as floppy disks, CD-ROMs, DVD-ROMs, hard disks, flash memory, etc. A carrier wave that carries the code across a network is another example of a computer-readable storage medium.

Network device 100 interfaces with physical media via a plurality (two are depicted) of network interfaces 106. For example, one of network interfaces 106 may be an Ethernet interfaces, Gigabit Ethernet interface, 10-Gigabit Ethernet interface etc. Frames that are received, processed, and forwarded by network device 100 may be temporarily stored in a frame memory 108.

Depending on its role, network device 100 implements various network protocols, extensions thereof, and data networking features. For example, network device 100 may implement an Ethernet switch. Network interfaces 106 may then be Ethernet interfaces, each connected to a host device such as a computer, media server, VoIP telephone, etc., or to a hub. Network device 100 is aware of the devices reachable through each network interface and switches frames between interfaces accordingly based on their MAC addresses as defined by the well-known IEEE 802.3 standard. Where collisions are detected and frame transmission should be postponed, the frames may be stored in frame memory 108. A representative switch usable to implement embodiments of the present invention is the Cisco 1548M MicroSwitch or comparable hardware available from Cisco Systems of San Jose, Calif.

Alternatively, network device 100 may be an Ethernet hub. Network interfaces 106 may then be Ethernet interfaces and connect to hosts, switches, or other hubs. In the hub configuration, received Ethernet frames are relayed out via all interfaces. A hub may be based on the LXT915 integrated circuit available from Intel of Santa Clara, Calif.

Figure 2:
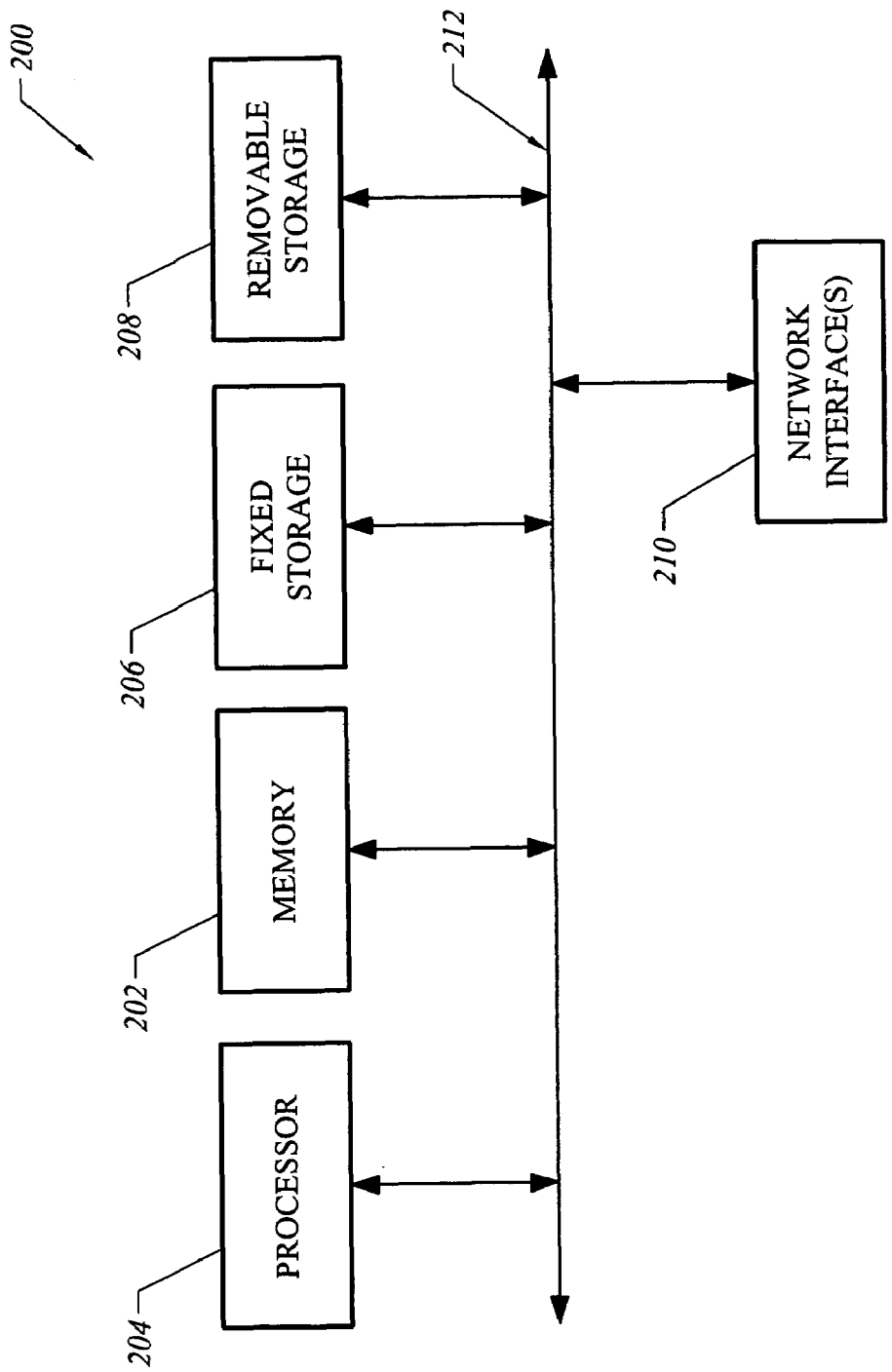
FIG. 2 depicts a computer system useful in implementing one embodiment of the present invention.

FIG. 2 shows a system block diagram of a computer system 200 that may be used to implement one embodiment of the present invention. Computer system 200 includes a memory 202 which can be utilized to store and retrieve software programs incorporating computer code that implements aspects of the invention, data for use with the invention, and the like. Exemplary computer readable storage media include CD-ROM, floppy disk, tape, flash memory, system memory, and hard drive. Additionally, a data signal embodied in a carrier wave (e.g., in a network including the Internet) may be the computer readable storage medium. Computer system 200 further includes subsystems such as a central processor 204, fixed storage 206 (e.g., hard drive), removable storage 208 (e.g., CD-ROM drive), and one or more network interfaces 210. Other computer systems suitable for use with the invention may include additional or fewer subsystems. For example, computer system 200 may include more than one processor 204 (i.e., a multi-processor system) or a cache memory. Computer system 200 may also include a display, keyboard, and mouse (not shown) for use as a host.

The system bus architecture of computer system 200 is represented by arrows 212 in FIG. 2. However, these arrows are only illustrative of one possible interconnection scheme serving to link the subsystems. For example, a local bus may be utilized to connect the central processor 204 to the system memory 202. Computer system 200 shown in FIG. 2 is only one example of a computer system suitable for use with the invention. Other computer architectures having different configurations of subsystems may also be utilized.

In one embodiment, computer system 200 may be a Cisco Media Convergence Server, e.g., a MCS 7825-800 based on the Intel Pentium III 800 MHz processor. This Media Convergence Server can oversee communication between numerous IP phones.

Computer system 200 may also be a standard Microsoft Windows-based personal computer such as a desktop computer or laptop computer. Such a computer may incorporate or attach to a microphone and a speaker as peripheral devices and emulate an IP phone by operating software such as Cisco SoftPhone.

Real-Time Operator Communication in an Optical System

Figure 3:
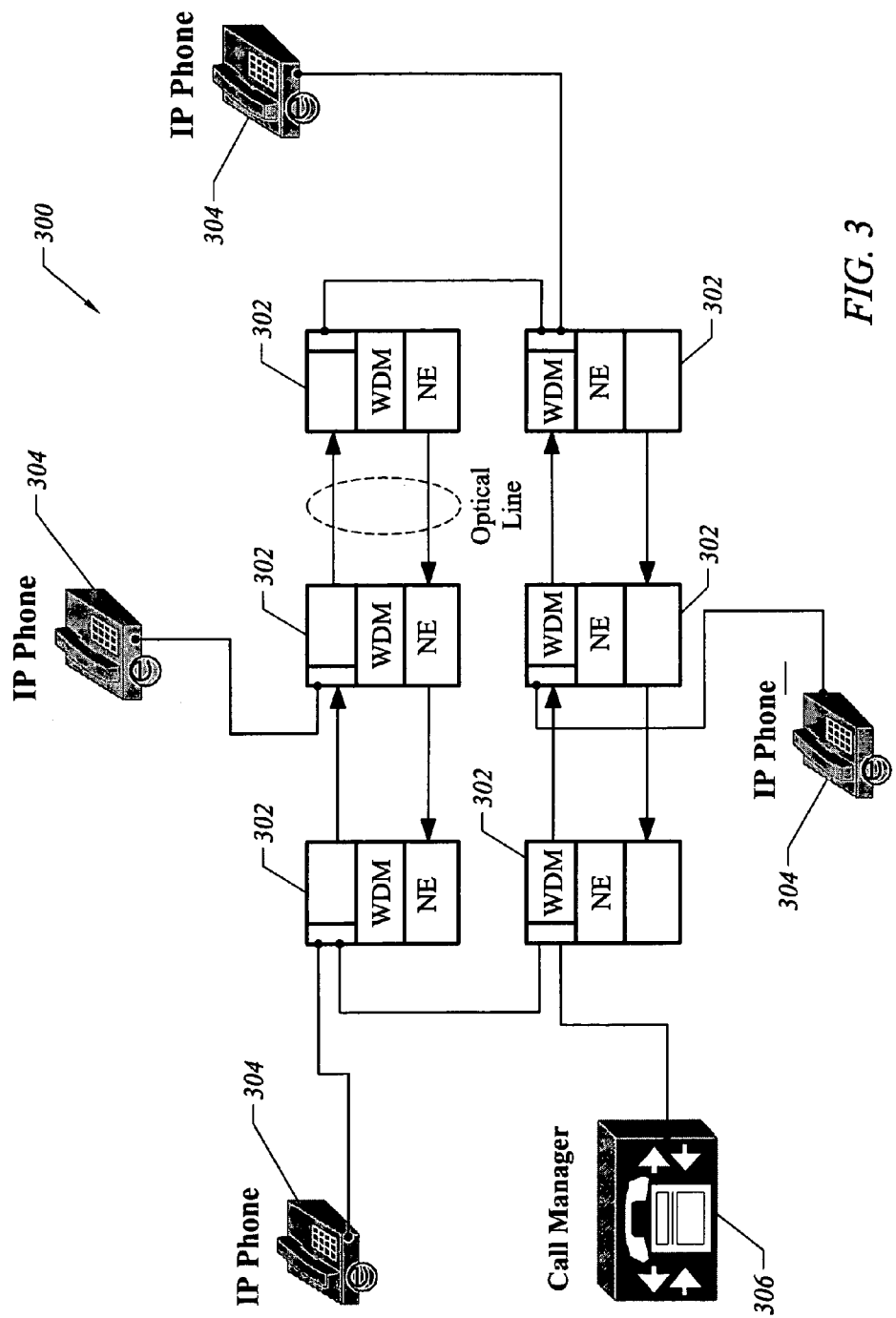
FIG. 3 depicts an overall representation of a phone network interconnecting sites of an optical communication system according to one embodiment of the present invention.

FIG. 3 depicts an overall representation of a phone network interconnecting sites of an optical communication system 300 according to one embodiment of the present invention. Optical communication system 300 includes multiple WDM network elements (NEs) 302. Optical communication system 300 is configured as a pair of bi-directional optical lines, interconnecting the network elements 302. Each bi-directional optical line carries multiple optical signals or channels on assigned wavelengths. In representative system 300, each network element 302 is either a terminal site where optical channels are multiplexed/demultiplexed into/from the WDM flow, or an optical line site where the WDM flow is amplified, or an optical add/drop multiplexer (OADM) that drops and adds selected channels. Optical receivers are used to recover the data from the demultiplexed or dropped channels and optical transmitters are used to generate modulated optical signals for the multiplexed or added channels. The depicted configuration can be used to provide redundancy as known in the art (e.g., one line could be the working path, while the other could be the protection path).

The configuration shown in FIG. 3 of course is merely presented by way of example. The present invention may also be applied to different optical network topologies such as ring networks, mesh networks, etc. OADMs, WDM transceivers, etc. may be implemented by the ONS 15808 DWDM platform available from Cisco Systems.

As will be explained in greater detail below, network elements 302 are augmented with Ethernet facilities such as switches and/or hubs and special modems to create a local area network available to interconnect equipment such as IP phones 304 and Call Manager 306. IP phones 304 and Call Manager 306 preferably connect to their respective network elements 302 using a standard 10/100Base Tx Ethernet connection utilizing an RJ-45 interface. Call Manager 306 may be implemented by a computer system as described above. IP Phone 304 may be a Cisco 7960 IP Phone.

LAN data is exchanged via an optical service channel (OSC). In one embodiment, the OSC is assigned a wavelength outside the spectrum employed to transmit payload data. In one particular implementation, the chosen wavelength is approximately 1480 nm. The OSC may be carried bidirectionally through the link.

In one embodiment the OSC carries data at a bit rate of 2.048 Mbps using Coded Mark Inversion line coding as known in the art. The frame structure is as defined by the ITU G.704 standard. Each frame includes 32 slots numbered 0 through 31 with a repetition rate of 8000 Hz. LAN data according to the present invention may be carried in slots 4 through 31, also referred to as telemetry slots or T slots. This provides 1.792 Mbps of data carrying capacity for the LAN.

Figure 4:
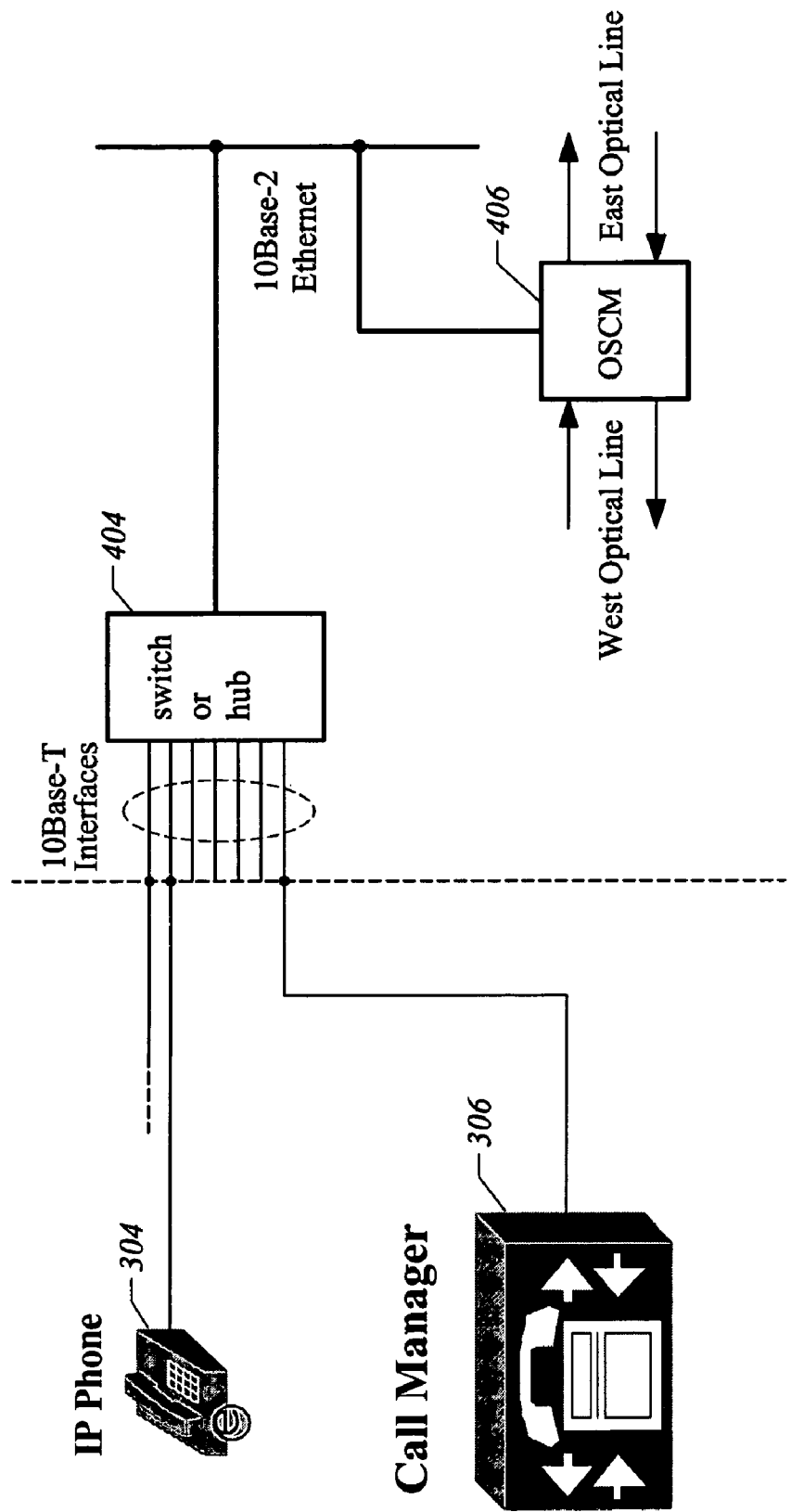
FIG. 4 depicts connections to an optical network element according to one embodiment of the present invention.

FIG. 4 depicts connections to an optical network element 302 according to one embodiment of the present invention. Network element 302 includes an optical service channel modem (OSCM) 402 that exchanges Ethernet frames with the service channels running in each direction. In FIG. 4, the directional links are referred to as East and West. For each direction, the service channel is isolated from the WDM signal using a special OADM that then adds back in the service channel signal as generated by the modem. An optical receiver recovers data from the received OSC signal and an optical transmitter generates an optical signal modulated with the transmitted OSC data. For many of the slots OSCM 402 will simply be relaying the received channel data. OSCM 402 incorporates a TDM (time division multiplexing) controller to maintain correct slot boundaries and to know when to transmit data.

OSCM 402 incorporates a 10 Base-2 Ethernet port. Ethernet frames received within slots 4 through 31 of the OSC are output onto the 10 Base-2 Ethernet port. Ethernet frames received via the 10 Base-2 Ethernet port are output within slots 4 through 31.

The 10 Base-2 Ethernet port of OSCM 402 couples to an Ethernet access device 404, which may be, e.g., an Ethernet switch or hub as described above. Ethernet access device 404 provides multiple 10 Base-T interfaces for connecting to equipment such as IP phone 304, Call Manager 306, etc. The 10 Base-T interfaces have RJ-45 physical interfaces. Advantageously, these may be used to provide power to devices such as IP phones 304.

Figure 5:
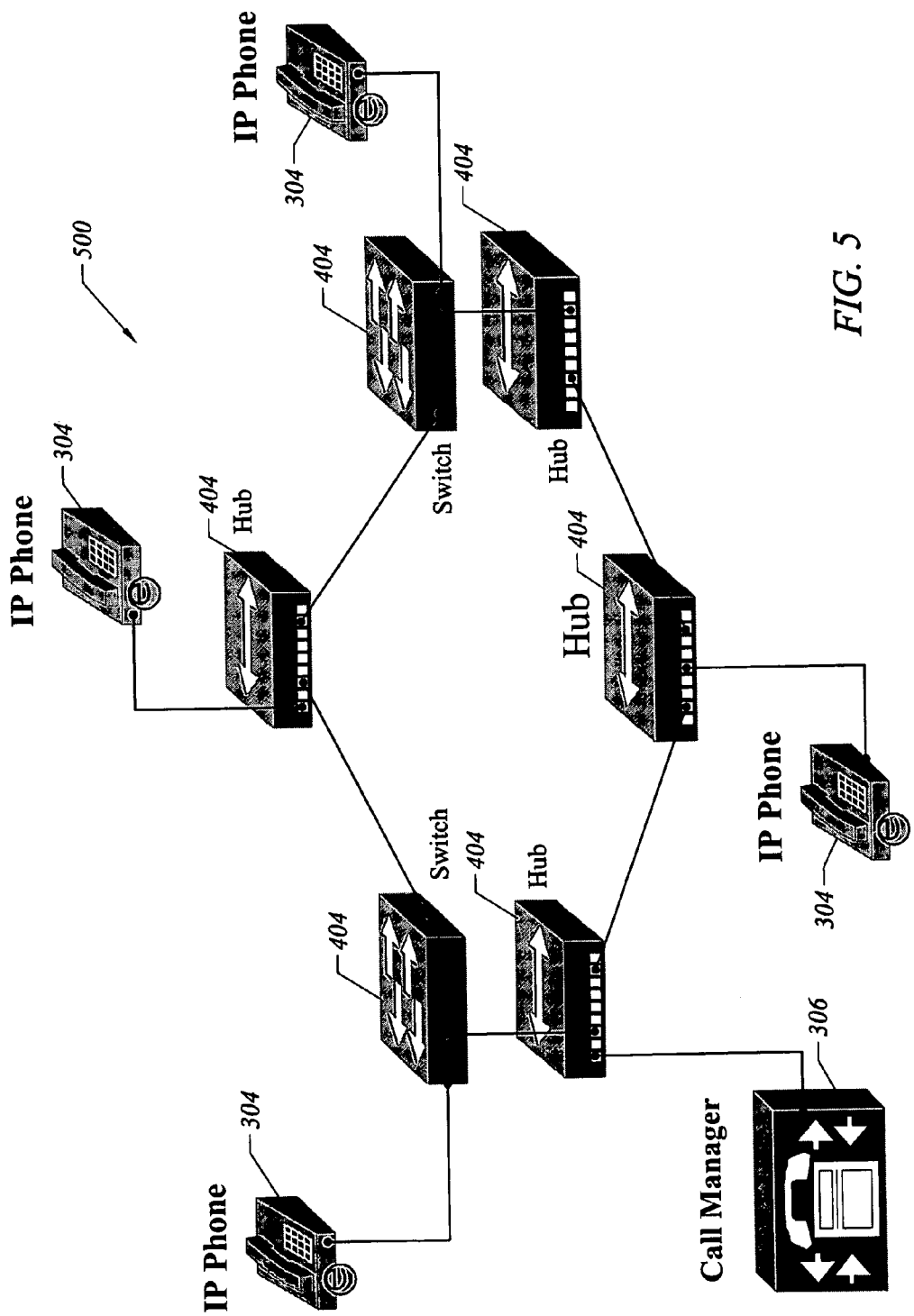
FIG. 5 depicts a local area network connecting IP telephony equipment according to one embodiment of the present invention.

The effect of the connections to network elements 302 as shown in FIG. 4 is to establish a local area network interconnecting Ethernet equipment located at the various sites of the optical communication system. FIG. 5 depicts the structure of a representative local area network 500 connecting IP telephony equipment according to one embodiment of the present invention. Connectivity is depicted at layer 2 (the Ethernet layer). The OSC and the modems used to access the OSC are transparent to the devices shown in FIG. 5 and they interact as they would in a conventional LAN. Each port at a switch defines a collision domain for the purpose of Ethernet operation. Frames are relayed through all interfaces of the hubs. Switches relay received frames to a particular output interface based on the frame's MAC layer address.

A feature of the arrangement of FIG. 5 is that IP packets may be exchanged without the use of an IP (Layer 3) router. In one embodiment, IP addresses are assigned by Call Manager unit 306 by use of the well-known DHCP protocol. IP packets exchanged within local area network 500 are encapsulated within Ethernet frames. Each Ethernet frame has an associated Ethernet MAC layer address. It is this address that is preferably used 1) for forwarding decisions by switches of network 500, 2) to designate the destinations of frames containing IP packets, and 3) for each device to identify the frames addressed to it. The MAC layer address of corresponding to an IP destination address may be obtained from a local cache of the originating device, or if not known there, may be discovered by use of a broadcast message in accordance with the well-known Address Resolution Protocol (ARP).

At the application layer, Voice over IP (VoIP) information is exchanged. In one embodiment this is done in accordance with the H.323 standard. Call Manager 306 registers IP phones in the VoIP network, configures network parameters such as compression type, maximum bandwidth, etc. Call Manager 306 may provide extensive functionality including voicemail messaging, unified voicemail and email messaging, conference call configuration, call forwarding, call waiting, caller ID, video conferencing, etc. Call Manager 306 may be duplicated to provide resilience to failure.

IP Phones 704 may incorporate features such as call waiting, call forwarding, caller ID, conference calling, on-line directory, voicemail message display, etc. IP Phones 704 may be powered from a separate adapter or may advantageously draw their power from the RJ-45 connection to the local switch or hub.

VoIP calls are signaled and operated in accordance with the H.323 standard in one embodiment. Alternatively, SIP (Session Initiated Protocol) or other suitable protocol may be employed. Examples of voice compression algorithms that may be used include the ITU G.711 and G.729 standards. Further economy in bandwidth usage results from the use of voice activity detection (VAD) to suppress packet generation during silent periods of a call. If additional voice bandwidth is needed, one or more of OSC slots 0-3 may be added to the bandwidth pool available to the LAN.

With use of appropriate compression techniques and VAD, total required bandwidth per call can be reduced to, e.g., 7.3 Kbps. During a conference call, the required bandwidth increases depending on the number of connected users. Bandwidth used to support voice calls may then become unavailable for telemetry functions.

Figure 6:
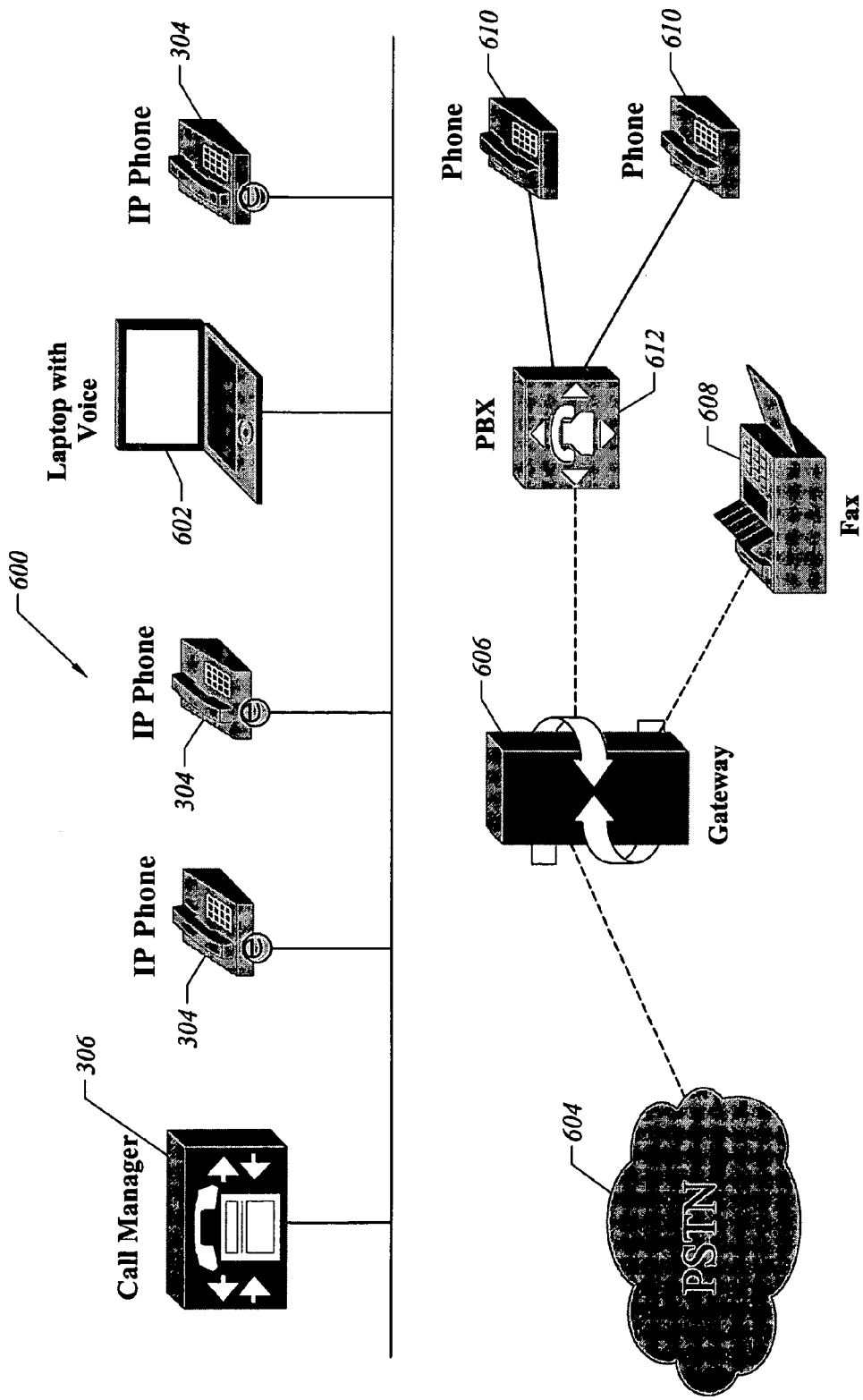
FIG. 6 depicts how access to the public telephone network and non-IP telephones may be provided according to one embodiment of the present invention.

FIG. 6 depicts a local area network 600 that interconnects voice IP telephone equipment in a manner similar to local area network 500 and includes further types of equipment. A voice-equipped laptop computer 602 incorporates a microphone, speaker, and appropriate software to essentially emulate the functions of IP phones 304 while also providing convenient unified email and voicemail messaging. Access to the public switched telephone network (PSTN) 604 is provided through a voice gateway 606. Voice gateway 606 may be an appropriately programmed computer system such as the Cisco VG200 Voice Gateway. Voice gateway 606 may also provide connectivity to a fax line or fax machine 608 and to conventional telephones 610 through a PBX 612.

Although functionality of the present invention has been largely described above with reference to voice functions, the present invention may also be applied to video conferencing, web conferencing sessions, etc. All of these may be accomplished by use of a LAN operating in the OSC. The Media Convergence Server may be capable of supporting video conferences, web conferences, etc. Users may also be able to access on-line training manuals, videos, etc. and generally information useful in maintaining and operating the WDM link.

It is also contemplated that the bandwidth of the OSC may be greatly expanded to, e.g., 100 Mbps. The usable LAN bandwidth would then increase accordingly, greatly facilitating applications taking advantage of video interaction. Switch and hub bandwidth would be scaled appropriately and 100Base-T connections would be made available.

It has been seen that embodiments of the present invention may provide real time communication such as voice communication between geographically distributed sites of a WDM system. This capability may be provided at low cost, with relatively little consumption of space, and without the use of IP (Layer 3) routers.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense. For example, the OSC may be implemented by sharing a single wavelength or by modulating multiple wavelengths with payload data.

The invention claimed is:

1. A method for providing media access at a site in a WDM system, said method comprising:
providing connectivity via an Ethernet switch to a LAN interconnecting a plurality of physically separated sites in said WDM system, said LAN being implemented via an optical service channel of said WDM system, said optical service channel having a wavelength that is outside a spectrum used to transmit payload data in said WDM system; and exchanging LAN data comprising voice over IP packets with another site via said optical service channel, wherein exchanging LAN data comprises:

receiving an optical signal comprising said optical service channel and said payload data;

isolating said optical service channel from said payload data of said optical signal;

exchanging Ethernet frames with said optical service channel;

exchanging voice over IP information at an application layer; and generating an optical signal modulated with optical service channel data; and wherein said voice over IP packets are encapsulated within Ethernet frames, each of said Ethernet frames having an associated Ethernet MAC address corresponding to an IP destination address of said LAN data so that said voice over IP packets are directed to said another site according to said MAC address and without the use of Layer 3 routers.

2. The method of claim 1 wherein exchanging voice over IP packets comprises:

employing a media convergence server configured to manage communications between a plurality of IP phones utilizing said voice over IP packets exchanged via said optical service channel.

3. The method of claim 1 wherein exchanging voice over IP packets comprises:

employing a voice over IP (VoIP) telephone.

4. The method of claim 1 further comprising assigning IP addresses by a call manager.

5. The method of claim 4 wherein assigning IP addresses comprises utilizing DHCP protocol.

6. The method of claim 1 wherein exchanging LAN data comprises carrying LAN data in telemetry slots of a frame.

7. The method of claim 1 further comprising coupling an Ethernet port of an optical service channel modem to an Ethernet access device to provide connection to equipment at the site.

8. The method of claim 1 further comprising utilizing voice activity detection to suppress packet generation during silent periods of a call.

9. The method of claim 1 wherein exchanging LAN data further comprises utilizing a voice compression algorithm.

10. The method of claim 1 further comprising adding optical service channel slots to a bandwidth pool available to the LAN.

11. At a site in a WDM system, apparatus for exchanging media information with another site via an optical service channel of said WDM system, said apparatus comprising:

a LAN access device providing connectivity to a LAN interconnecting a plurality of sites of said WDM system via an optical service channel having a wavelength that is outside a spectrum used to transmit payload data in said WDM system; and a media device that exchanges LAN data comprising voice over IP packets with said another site via said optical service channel and is configured for directing said LAN data to said another site without the use of an IP router, said media device configured to exchange voice over IP information at an application layer;

wherein the LAN access device comprises an Ethernet switch and an Ethernet Hub, and is configured for connection to an Ethernet port of the media device to provide connection to equipment at a site, and said voice over IP packets are encapsulated within Ethernet frames, each of said Ethernet frames having an associated Ethernet MAC address corresponding to an IP destination address of said LAN data so that said voice over IP packets are directed to said another site according to said MAC address and without the use of Layer 3 routers.

12. The apparatus of claim 11 wherein said media device comprises a media convergence server configured to manage communications between a plurality of IP phones utilizing said voice over IP packets exchanged via said optical service channel.

13. The apparatus of claim 12 wherein the media convergence server is operable to support video conferencing utilizing LAN data exchanged via said optical service channel.

14. The apparatus of claim 11 further comprising a time division multiplexing controller for use in determining when to transmit data.

15. The apparatus of claim 11 wherein the LAN comprises one or more IP phones and one or more call managers.

16. The apparatus of claim 15 wherein the call manager is duplicated to provide backup.

17. The apparatus of claim 11 wherein the media device is configured to support video conference.

18. Apparatus for providing media access at a site in a WDM system, said apparatus comprising:

means for providing connectivity via an Ethernet switch to a LAN interconnecting a plurality of physically separated sites in said WDM system, said LAN being implemented via an optical service channel of said WDM system, said optical service channel having a wavelength that is outside a spectrum used to transmit payload in said WDM system; and means for exchanging LAN data comprising voice over IP packets with another site via said optical service channel, wherein means for exchanging LAN data comprises:

means for receiving an optical signal comprising said optical service channel and payload data;

means for isolating said optical service channel from said payload data of said optical signal;

means for exchanging Ethernet frames with said optical service channel;

means for exchanging voice over IP information at an application layer; and means for generating an optical signal modulated with optical service channel data; and wherein said voice over IP packets are encapsulated within Ethernet frames, each of said Ethernet frames having an associated Ethernet MAC address corresponding to an IP destination address of said LAN data so that said voice over IP packets are directed to said another site according to said MAC address and without the use of Layer 3 routers.

19. The apparatus of claim 18 wherein said means for exchanging voice over IP packets comprises:

a media convergence server configured to manage communications between a plurality of IP phones utilizing said voice over IP packets exchanged via said optical service channel.

20. The apparatus of claim 18 wherein said means for exchanging voice over IP packets comprises:

a voice over IP (VoIP) telephone.

* * * * *